United States Patent [19]

Parker

[11] Patent Number: 5,050,823
[45] Date of Patent: Sep. 24, 1991

[54] RADIO-BASED RAILWAY SWITCH CONTROL SYSTEM

[75] Inventor: John W. Parker, Rochester, N.Y.

[73] Assignee: General Signal Corporation, Rochester, N.Y.

[21] Appl. No.: 444,506

[22] Filed: Nov. 30, 1989

[51] Int. Cl.$^5$ .......................... B61L 7/08; B61L 5/06
[52] U.S. Cl. ........................................ 246/5; 246/219; 246/393
[58] Field of Search ........................ 246/2 R, 2 E, 3, 5, 246/218, 219, 220, 221, 222, 224, 246, 249, 255, 393

[56] References Cited

U.S. PATENT DOCUMENTS

| | | | |
|---|---|---|---|
| 3,110,885 | 11/1963 | Gibson et al. | 246/5 X |
| 3,218,452 | 11/1965 | Hughson | 246/219 X |
| 3,836,768 | 9/1974 | Clarke et al. | 246/5 X |
| 3,976,272 | 8/1976 | Murray et al. | 246/5 |
| 4,090,173 | 5/1978 | Sibley . | |
| 4,181,849 | 1/1980 | Sibley | 377/20 |
| 4,307,463 | 12/1981 | Sibley . | |
| 4,368,534 | 1/1981 | Sibley . | |
| 4,498,650 | 2/1985 | Smith et al. . | |
| 4,563,762 | 1/1986 | Sibley . | |
| 4,610,206 | 9/1986 | Kubala et al. | 246/2 R X |
| 4,611,291 | 9/1986 | Hoelscher | 246/5 X |
| 4,611,775 | 9/1986 | Petit | 246/220 X |
| 4,617,662 | 10/1986 | Auer et al. . | |
| 4,711,418 | 12/1987 | Aver et al. | 246/5 |
| 4,740,972 | 4/1988 | Rutherford, Jr. . | |
| 4,831,521 | 5/1989 | Rutherford, Jr. . | |
| 4,860,977 | 8/1989 | Norton | 246/3 |

Primary Examiner—Frank E. Werner
Assistant Examiner—Scott L. Lowe
Attorney, Agent, or Firm—Martin Lukacher; Martin E. Kleinman

[57] ABSTRACT

A switch machine operates a track switch under radio control via a switch controller. The switch controller may be given an identifying address unique to it which distinguishes the switch machine from other switch machines in the railway territory. In addressing or programming the switch machine, a portable terminal is used. The controller is enabled by a manually actuable switch to accept identifying addresses which is stored in electrically erasable programmable read-only memory (EEPROM). Whenever a message is received over the radio link, the identifying address is read out of memory. In order that the identifying address is vital (failsafe) and to guard against any errors which change the identifying address and which can cause the controller to effectuate operation of the track switch in front of an oncoming train or when the train is over the switch, the address is stored in the EEPROM by encoding the identfying address into unique multi-bit check words. Whenever a request to read the address is received by the switch controller, an attempt is made to write check value words, the value of which is equal to the difference between the value of the unique check words and the check words. A check value word replaces a unique check word in the event of a failure in the EEPROM or its addressing logic. The check value is also read into a check word register. The content of the check word register and the location in EEPROM for the check word under test is read into exclusive or gates. If there is a failure, the output of the array is a word having a value of zero, whereas if there was no failure the result of the exclusive or operation will be a word having the value of the check word. These check words are used in providing a vital output message for controlling the track switch and to provide and acknowledge message for transmission over the radio link to the central office of locomotive which communicates with the railway track switch controller. The switch is powered only when a vital output representing a desired switch operation (throwing the switch to normal to reverse or vice versa) is called for over the radio link.

12 Claims, 6 Drawing Sheets

RADIO-BASED RAILWAY SWITCH CONTROL SYSTEM

DESCRIPTION

1. Introduction

The present invention relates to a system (method and apparatus) for vital (fail-safe) control of a operating component in response to messages identifying the component and commanding the operation thereof, and more particularly to a railway signaling system for controlling components, such as track switches and the like, in a vital manner in response to digital messages which are transmitted over a radio communications link.

The invention is especially adapted for use in a radio-based railway track switch control system which is described in detail below as the exemplary embodiment of the invention. An important aspect of the invention is in the verification of the integrity of data identifying the component which is to be controlled, and specifically, with respect to a track switch, the address of that switch which identifies it uniquely among other track switches and other components in the railroad territory. The address verification aspect of the invention may find application in other control systems wherein addresses of components are important to their successful operation.

2. Background

In traditional railroad practice, track switches or other powered components are controlled from a central office, usually where the train dispatcher is located. In order to operate a switch, the dispatcher operates a mechanism on a control machine in the office which generates a message to the switch instructing it to move to the requested position; normal where the switch allows the train to travel along the main line and reverse where the switch directs the train to a siding or other track. The office logic will normally not allow this message to be generated and sent unless the requested switch movement is safe under existing conditions. These office logic checks are non-vital and cannot be relied upon for safety. System safety is guaranteed by vital field logic along the railway right of way which will only allow power to be applied to the switch when conditions will safely allow the switch to be thrown. The field logic vitally insures that a switch cannot be thrown in front of an approaching train or under a train occupying the switch. Such field logic systems are in general use and are implemented using safety relays or vital processing techniques; for example, as described in the following U.S. Pat. Nos.: Smith, Hoelscher and Petit, 4,498,650; Sibley, 4,181,842; Sibley 4,090,173; and Murray, 3,976,272.

A vital radio-based railway signaling and traffic control system which is not dependent upon track circuits is described in Auer and Petit, U.S. Pat. No. 4,711,418. Such systems are known as the GRS (General Railway Signal) "Spacerail" system. In the Spacerail system, track circuits and signals are replaced by a system of wayside markers (beacon transponders), and data communication between the train and the control office over a radio link. Vital processing is performed by the system which has in vital form information concerning train location and operating conditions (e.g., train speed). The Spacerail system also provides for track switch control over the radio link. When the dispatcher requests a specific switch alignment, the central office processor determines if such a control can be safely issued. If conditions permit, a vital message is generated and sent to a switch controller which decodes the message and uses it as its authority to reposition the switch. Since there is very little ancillary equipment along the right of way, reliance is placed on the vital nature of the message which is sent to the switch controller. When the switch has been repositioned, the switch controller sends a secure message to the office confirming its status. The office uses the receipt of this message to confirm that the switch has indeed been aligned in the desired position and that the trains can be routed over the switch. The absence of such an acknowledgement message within a period of time alerts the dispatcher to a problem in the switch or the controller.

The vital message contains the address of the switch as well as the instructions to position the switch. Within each switch in the railroad territory, the message is received and the address information is used to determine whether the message is for that particular switch. If the message is not for that switch, it is disregarded. The address of the switch has heretofore been hard wired. It is desirable to address different switches in the field rather than the factory. It is also desirable to change the address when a switch is moved to a new location. Hard wiring of addresses makes difficult efficient and flexible maintenance of computerized track switches and other equipment which must be addressed in order to send messages thereto. Such other equipment may, for example, be control units in the locomotives or control units for other railway hardware, such as wayside signals. It is especially desirable to enable the addresses to be programmed in the field by personnel equipped with portable terminals.

Once the address is programmed is it is necessary to verify that the address has not been modified or the system is affected by a failure mode which allows the modification of the address, for example by inadvertance or by external electrical fields.

SUMMARY AND OBJECTS OF THE INVENTION

It is the principal object of the present invention to provide an improved system (method and apparatus) for verification of data identifying a component (viz., the address of that component) so that the component cannot be operated if the integrity of the address is impaired.

It is a further object of the present invention to provide an improved radio-based signalling and traffic control system wherein the address of each operating component, such as the track switches, is verified to insure the vital operation thereof.

It is a still further object of the present invention to provide an improved track switch control system which is vital in operation both as to the addressing and operational aspects of the system.

It is a still further object of the present invention to provide an improved radio-based railway control system having components, such as track switches, which may be programmed with identification addresses in the field by personnel with portable terminals from which address data can be entered into the components, and wherein the address is verified every time a message for operating the component is received.

Briefly described, a system for controlling a railway track switch or other component by data transmitted over a communications link which addresses the component and instructs it to carry out a requested operation has a non-volatile memory which is programmed with address data corresponding to the address of the component. This address data can be programmed when the controller is manually enabled. For example when personnel in the field having a terminal equipped for generating and entering the address operates a manual electrical switch. The controller is operative to store in the non-volatile memory at least one and preferably a plurality of check words for the address. The component is caused to operate only when the data which is transmitted corresponds to the programmed address in the memory and when words corresponding to the check words are produced by writing at least one check value message into a check register while presenting that check value to the memory to supplant the check word therein. It is only when a failure mode enables writing of the check value into the memory that the memory accepts the check value. The memory address data (either the proper address if there has been no failure mode or the check value if a failure mode has occurred) are combined, preferably by applying corresponding bits of the check value in the check register and the address, or the check value if accepted, from the memory to exclusive or gates. The check words in the memory are coded, preferably to have a value equal to the value of the check word exclusive ored with the check value. Then, if the address is correct, the exclusive or operation returns the check word which verifies the integrity of the address. The detection of the check word enables the carrying out of vital processing which turns on vital power for operating the component. In the case of the track switch, the vital power aligns the switch to the requested position (either normal or reverse).

BRIEF DESCRIPTION OF THE DRAWINGS

The foregoing objects, features and advantages of the invention as well as a presently preferred embodiment thereof, and the best mode now known for practicing the invention, will become more apparent from a reading of the following description in connection with the accompanying drawings in which.

DETAILED DESCRIPTION

Figure 1:
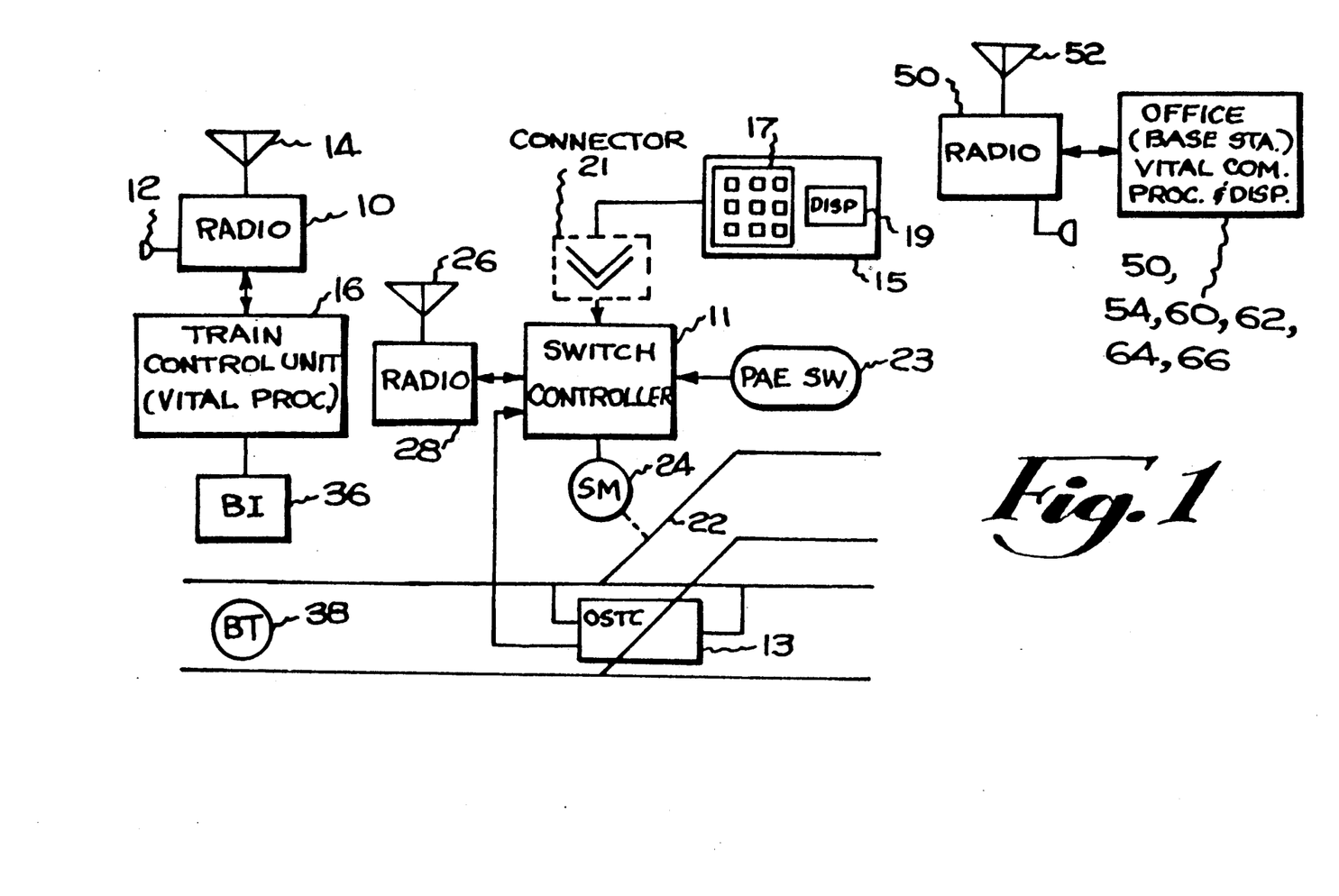
FIG. 1 is a block diagram of a radio-based railway signaling and control system, in accordance with the invention, embodying a track switch controller which is field programmable with address information.
Figure 2:
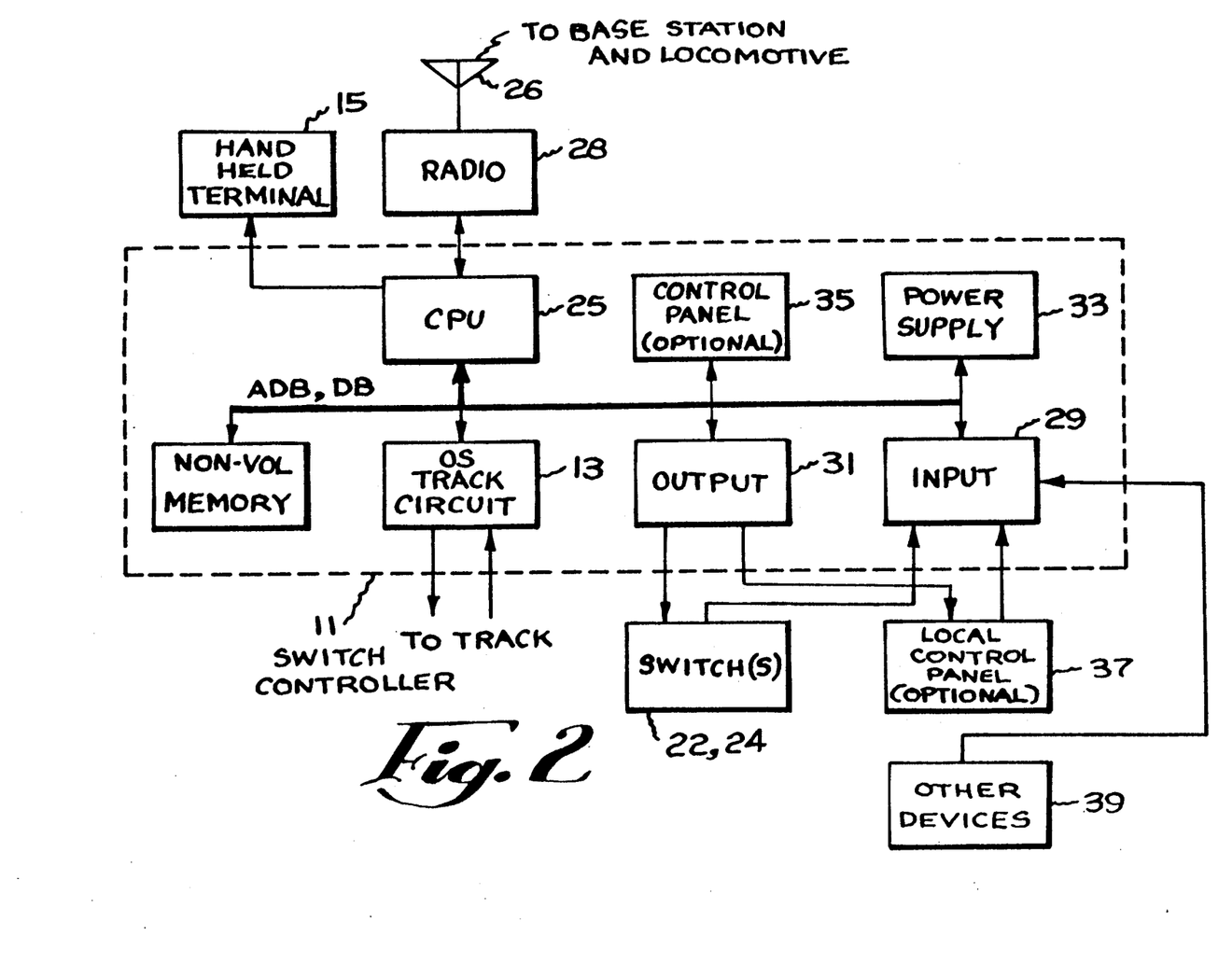
FIG. 2 is a block diagram showing the switch controller of the system illustrated in FIG. 1.

Referring more particularly to FIG. 1, there is shown a radio-based railway signaling and traffic control system which is similar to that described in the above-referenced Auer and Petit U.S. Pat. No. 4,711,417. This patent is incorporated herein by reference and like parts of the system shown in FIG. 1 and the system described and shown in the Auer and Petit Patent are identified with like reference numerals herein. The system shown in FIG. 1 is provided with an improved switch controller 11 for the switch machine 24 which operates the track switch 22. Below the track switch is an over switch track circuit 13 connected to the rails beyond each end of the switch 22. The over switch track circuit ("OSTC") is described in greater detail below in connection with FIG. 2. It provides an input to the switch controller representing occupancy of the track switch vicinity or the lack of occupancy thereby enabling the switch 22 to be realigned. The switch controller is programmable from a portable terminal indicated as the hand held terminal ("HHT") 15. This terminal has a keyboard 17 and a display, such as a LCD display 19. It is plugged into the switch controller when the switch controller is to be programmed with its address in the field. A connector 21, part of which is attached to the switch controller 11 and part to a cable from the HHT 15 is used for this purpose. When programming is to be done, a manually operated electrical switch for enabling the programming of the address (PAE SW) 23 on the switch controller is actuated. Only when the switch 23 is thrown to the position to enable addressing can the address be programmed into the switch controller. This switch is shown in greater detail in FIG. 3. It has two positions PAE and PAE not (the not is designated by a stroke (/) in the drawing and is so designated in FIG. 4 and elsewhere in the specification. The PAE position is with the switch thrown upwardly and the PAE/ position is with the switch thrown downwardly.

Figure 3:
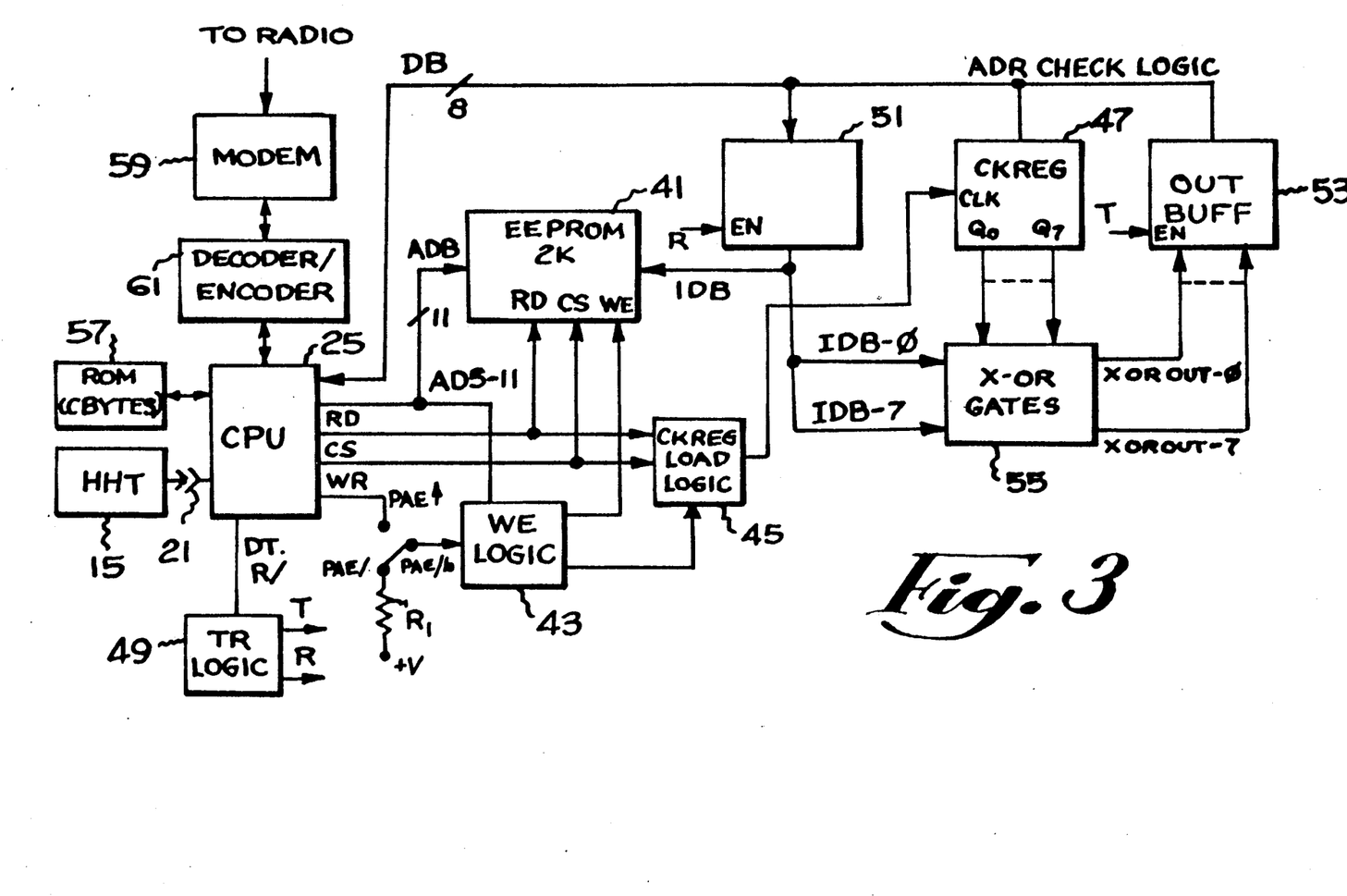
FIG. 3 is block diagram of the system for addressing and verifying the address of the switch which is utilized as part of the nonvolatile memory element of the system shown in FIG. 2.
Figure 4A:
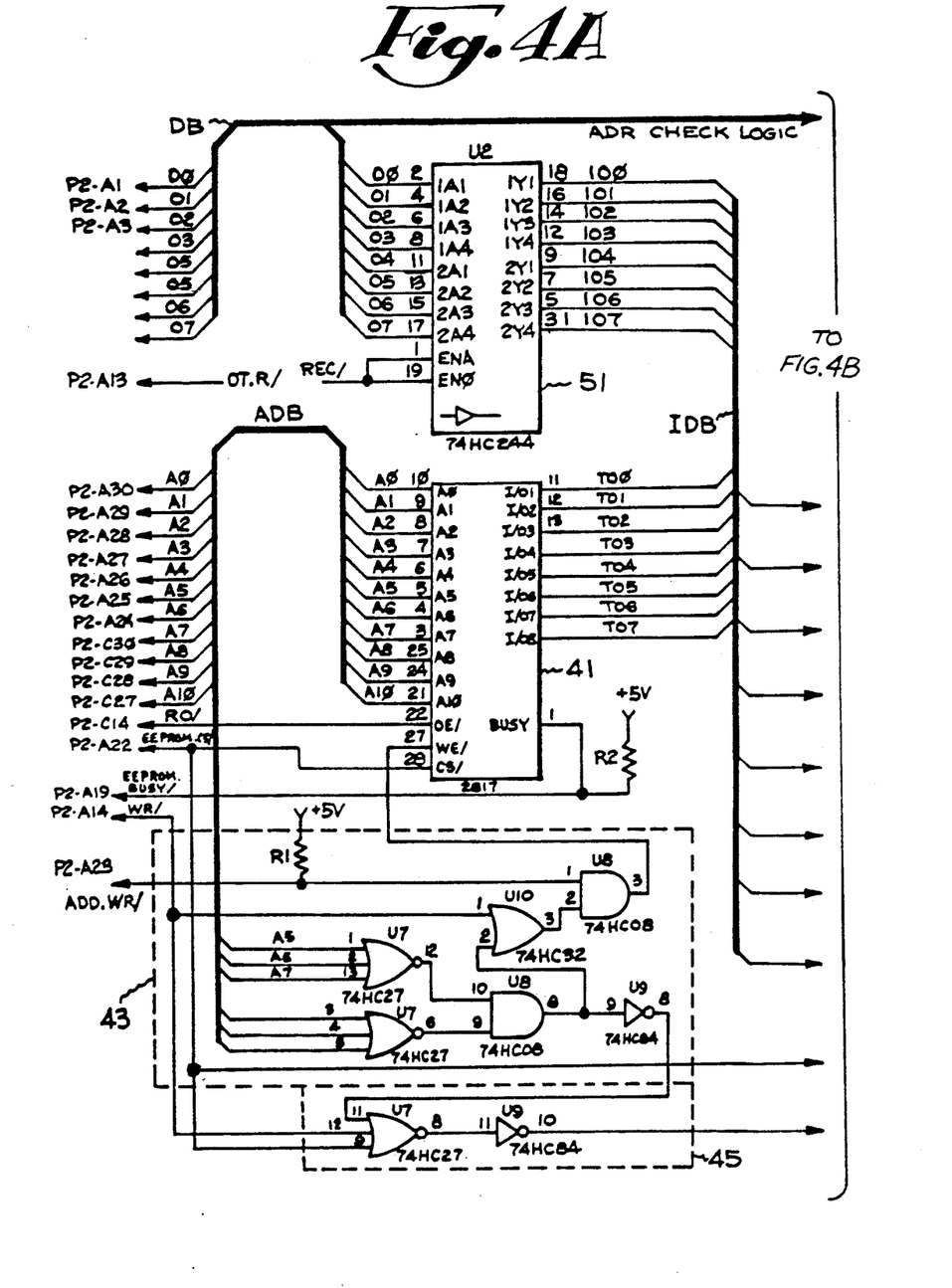
FIG. 4 is a more detailed schematic diagram of the system shown in FIG. 3.
Figure 4B:
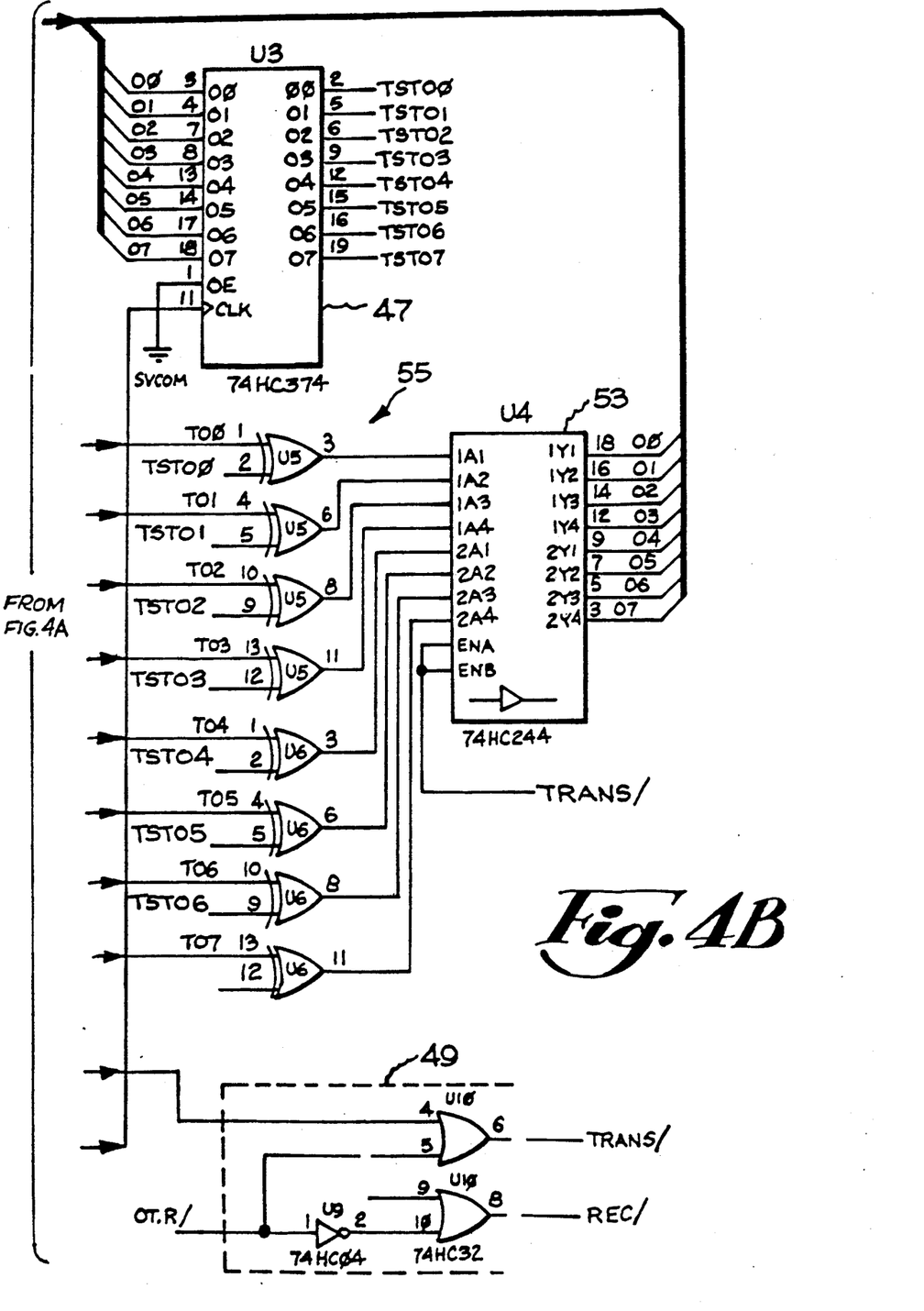

In order to guard against a failure in the PAE switch 23 or other failure modes which effect the address and cause it to change or to enable a writing into the address locations in the memory of the switch controller 11, the verification of address integrity system which is illustrated in FIG. 3 and more specifically in FIG. 4 is utilized. The verification system is part of the switch controller 11 shown in FIG. 2. The controller has a central processing unit (CPU) 25 which interfaces with the radio 28 and the track circuit 13 and other components of the controller 11 over an address and data bus (ADB, DB). The CPU contains memory and port circuits as well as a microprocessor chip such as the type 8088 available from Intel Corporation. A non-volatile memory unit 27, which is preferably on a separate circuit board from the CPU, contains the address verification system (FIGS. 3 and 4). Input and output circuits 29 and 31 are also preferably on their own circuit boards, as is a power supply 33. An optional control panel 35 and a local control panel 37 connected to the input and output circuits 29 and 31. Other devices 39 such as track circuits, broken rail detectors, etc. can also be monitored by the switch controller 11. The output circuits 31 interface directly to the switch machine 24 under control. The drive signal to the switch machine 24 is a bipolar voltage which is applied to the switch machine contactors to drive the switch normal or reverse. To drive the switch normal, a voltage of one polarity is generated, and to drive the switch reverse a voltage of the opposite polarity is generated in the output circuits 31. A bipolar signal is returned from the switch machine to the input circuits 29 to indicate the switch position. This voltage has one polarity when the switch is mechanically locked in one position and it has the other polarity when the switch is locked in the other position. No voltage is present whenever the switch is not mechanically locked. The optional local control panel 37 is useful to provide a local display of the switch position and to allow for local control of the switch (viz., at the switch machine rather than from the central office or from the locomotive).

In the preferred embodiment of the invention a radio link is shown for exchange of messages between the office (base station), the locomotive of the train, and the switch controller. It will be appreciated that other communication links, such as satellite, microwave, optical or wire links may be utilized and are comprehended by the term "radio".

In a preferred embodiment the CPU contains the microprocessor with its associated clock and reset logic, a peripheral interrupt controller (PIC), six sixteen bit timers, 8K of RAM, 64K of ROM, two serial ports, a modem for interfacing with the radio 28 and bus drivers and receivers to connect to the other boards of the controller 11. One serial port is used for communication locally to the HHT 15. The other may be a spare. The modem may consist of a universal synchronous-asynchronous transceiver (USART), a Manchester encoder/decoder and modem chip. The input circuits 29 contain bus interface circuits which allow the input circuits 29 to respond when addressed by the CPU 25. Non-vital inputs are intended for use with the optional local control panel 37 but may be used to monitor the external devices 39. A bipolar input circuit monitors the position of the switch machine 22, as discussed above. There may be other inputs connected to terminals for use during maintenance. These inputs may be vital using vital port logic such as described in Hoelscher, U.S. Pat. No. 4,611,291 and Rutherford, U.S. Pat. No. 4,740,972.

The output circuits 31 include bus interface circuits similar to those on the input circuits 29. There may be several, say ten non-vital outputs and one vital output. The non-vital outputs may be used to drive lamps on the local control panel 37 or other local devices (such as a snow melter). The vital output produces the bipolar output voltage for driving the switch 22 normal or reverse. This voltage is generated when the controller determines that a message addressed to the switch has been received and all processing indicates that the message is vital including the verification of the address of the switch. Such vital processes are described in Rutherford, U.S. Pat. No. 4,831,521.

The OS track circuit 13 may consist of bus interface circuits, a DC to DC converter and a Hall effect current sensor. A track circuit operates in a pulse mode. Periodically, the controller turns on the DC to DC converter which applies a low voltage (e.g., 2 volt) signal to the track. If a train is not present, this signal travels down the rails and into the Hall effect current sensor which detects the current verifying that no train occupies the vicinity of the switch. When a train enters the track circuit vicinity, its wheels short the rails and keep the pulses from reaching the Hall effect sensor. Failure to detect the pulses indicates the presence of a train. The HALL effect current sensor can be periodically checked with test currents to verify its continual functioning.

The nonvolatile memory board 27 contains as shown in FIG. 3 and in FIG. 4 an electronically erasable programmable read-only memory (EEPROM) 41. Only lower order bytes of the EEPROM are used to store the address of the switch controller 11 and its check messages as will be discussed more fully below. There are only thirteen bytes which are utilized. However, thirty-two bytes are allocated for ease of selection with binary logic. The remainder of the EEPROM can be read from and written into at any time as normal memory. The PAE switch 23 and write enable logic (WE logic) 43 enable address information to be read into the lower order bytes (locations) in the EEPROM memory 41. Addressing in enabled only when the PAE switch 23 is set to the address mode (upwardly as shown in FIG. 3). In this mode, the identification or location address of the switch machine and its controller can be programmed.

When the PAE switch 23 is not set to the address mode (PAE/-downwardly), writing to the address locations is inhibited. Instead, check register load logic 45 enables the data to be clocked into a one byte check register or latch 47.

The write enable (WE) logic 43 and the check register load logic (CK REG load logic) 45 together with the transmit/receiver logic 49, an input buffer 51 and an output buffer 53 causes data which is read from any of the address bytes not to be read directly, but only indirectly as data exclusively ored in exclusive or gates 55 with bytes stored in the check register 47.

There are locations in the memory 41 for the address data (a 16-bit number which may be stored in the two lowest order bytes of the EEPROM memory 41) and check words which are generated based upon the address data and unique check value words (C-bytes) which are stored in a read-only memory (ROM) 57. Each of the check word locations in memory 41 is addressed, after a received message is decoded and recognized as addressed to the switch controller. Such recognition is accomplished after the signal is received by a modem 59 and decoded by a decoder/encoder 61 in the CPU 25. Then, the C-bytes from the ROM 57 (check values) are presented via the data bus (DB), the input buffer (IN Buff) 51 and the internal data bus (IDB) to the EEPROM. If there is no failure mode, writing of the check values is disabled. However, the check values will instead be stored in the check register 47. After each attempt to write, the location into which the attempt is made is read out of the memory 41 via the IDB to the exclusive or gates 55 together with the check value from the check register 47. As noted above, the check values are different for each address location. Therefore each time an address byte is read, a check is made to verify that it is not possible to write into the address bytes. If the address bytes in the memory 41 are written into, their value will be the same as the value in the check register and the exclusive or gates will output a zero value byte which will be transferred via the output buffer 53 to the CPU 25.

The check words written into the check word locations in the memory 41 are generated from the addresses using tables corresponding to different bit positions in the address data. When the bit in a particular position is a zero, data is taken from the zero table. When the bit is a one, the data is taken from the one table. The table values are exclusively ored in an iterative manner to provide a four-byte "offset" check word and a seven-byte (49 bit) "check sum" check word. Reference may also be had to Auer, Sibley and Stewart U.S. Pat. No. 4,617,662 for a system for generating the check words which may be stored together with the address data in the lower bytes of the memory 41.

A 32-bit offset check word is utilized in order to verify whether the message received over the radio is valid. The 7-bit check sum is used to transmit a check sum together with messages generated in the switch controller either to the central office (base station) or to the trains. For purposes of address data verification, the offset bytes and the check sum bytes each have a different, unique check value added thereto. Accordingly, the exclusive or operation returns to the CPU 25, via the output buffer 53 and the data bus D 13, the offset and the check sum values when the address data is verified. Otherwise a zero value or some other value than that of the bytes of the offset or check sum will be returned. The CPU, by virtue of vital processes, as described in the Rutherford U.S. Pat. No. 4,831,521, allows the message to be processed as a vital message and to generate vital power via the output circuits 31 for operating the switch machine 24 only when check words are returned.

In summary, each time an address byte is read a check is made to verify that it is not possible to write into the locations of the address bytes. If it is possible, the writing of the value will wipe out the date as stored in the address location and data can never be read correctly from the address locations. The switch machine will then not operate and a message indicating that the switch machine has moved the switch to its requested position will not be returned to the locomotive or central office. A problem is then indicated. In no event will the switch 22 be operated in the event of a failure in the switch controller, such as a faulty address or any other failure. Thus vital operation is provided for.

FIG. 4 identifies in detail the various components of the address verification logic which is illustrated in FIG. 3 and described above. Suitable parts are shown in FIG. 4 solely for purposes of providing an exemplary configuration of the address check logic.

Figure 5:
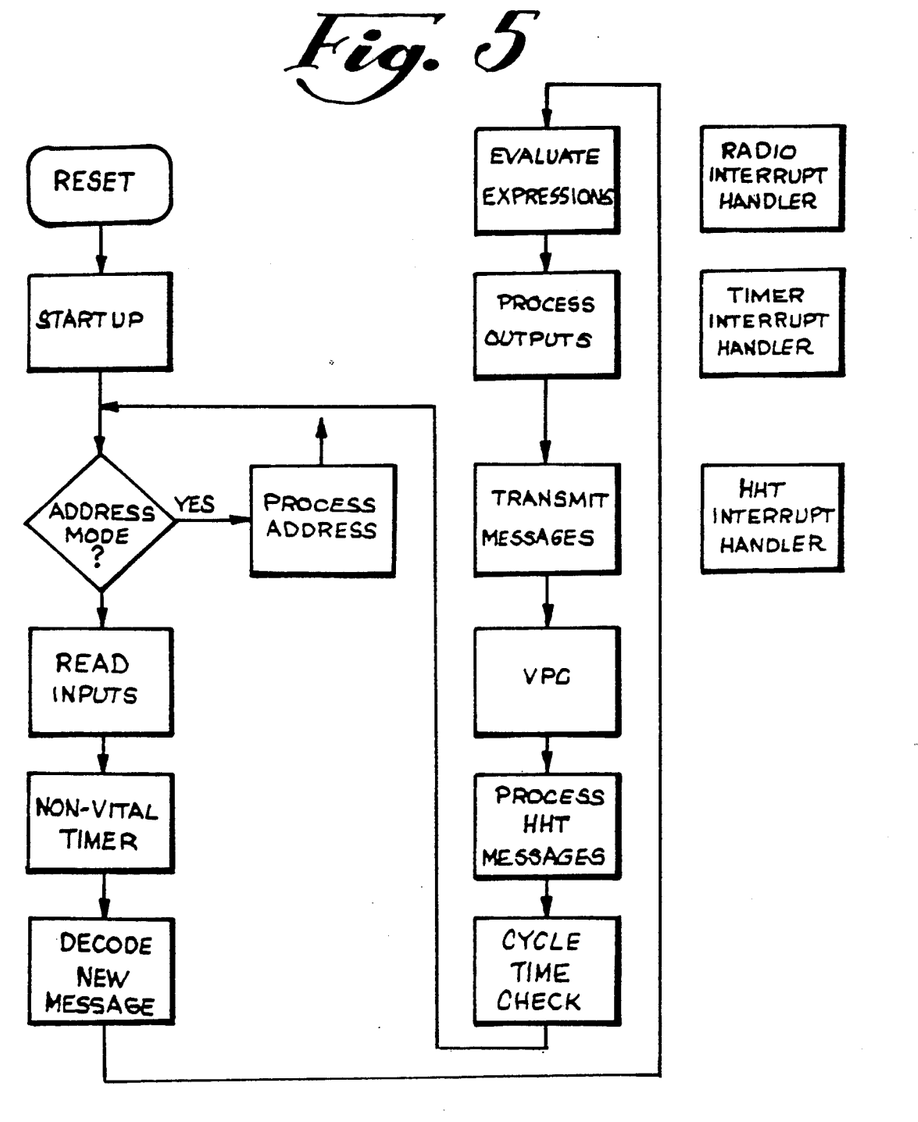
FIG. 5 is a flowchart illustrating the operation of the track switch controller.

The operation of the switch controller is shown in the flowchart of FIG. 5. The start up utilizes a routine which resets all latchable logic and counters and clears all memory locations. There is a main loop which repeats as long as the switch controller 11 operates. The programming of the CPU provides for logical expression evaluation as discussed in the Rutherford U.S. Pat. No. 4,831,521. The expressions determine the conditions under which the track switch 22 is to be thrown. The program proceeds by testing all inputs, and based upon the results of testing, variables in a logical expression which describes the system performance are set. These expressions are evaluated, and, based upon the results of the evaluation, the outputs are applied to the switch or are transmitted to the locomotive or central office. Thus, there are messages of two types, namely messages to be transmitted and the vital output which creates power to drive the switch machine 24. The controller program, as shown by the loop after start up, runs repeatedly, constantly monitoring conditions under which the switch can be thrown and operating the track switch 22 if a message requesting switch operation is received, and transmitting acknowledgment and response messages.

At the beginning of each cycle, a check is made to determine whether the system is in the address mode (i.e. whether the PAE switch 23 is in the PAE or PAE/ position. See FIG. 3). If the system is in the address mode, a new address can be programmed into the nonvolatile memory (the EEPROM) 41. Address programming is carried out by means of the HHT 15. As long as the PAE switch is up, all processing other than attempts to update the address will stop. As explained above, the address check logic (FIGS. 3 and 4) ensures that the system must not be in the address mode in order that normal reading of the address be permitted. Since it is physically impossible to read the address while in the address mode, processing must stop since no messages can be received or transmitted.

When the system is not in the address mode, the inputs are read. The vital input check is accomplished by circulating 32 bit values through the vital input circuits in a manner similar to that described in Hoelscher U.S. Pat. No. 4,611,291. Briefly, if power is present at a vital input, the 32 bit value is complemented and returned. This value is confirmation that the vital power is present at the input. The value is used to establish the logic state of a logical variable associated with the vital input. The link between inputs, both vital and non-vital and their associated logic variables is a data table in ROM in the CPU which describes each input and specifies its associated variable. If vital power is not present at the vital input, the circulated value is not returned and a false value is taken from the ROM data tables corresponding to the input being processed and is used to set the corresponding logical variable false. Then, upon expression evaluation, the conditions for switch operation will not be present and the switch will not operate, thereby providing for vital operation thereof. Non-vital inputs are processed by setting a variables in data corresponding to these inputs true or false in accordance with the state of the non-vital input when it is tested or sampled.

The processing of non-vital timers then occurs. These timers are used for system timing functions such as switch operation time limiting and for repeating of unacknowledged messages. When the timer is active, the timer—interrupt handler, shown in the upper right hand portion of FIG. 5, counts down an associated register which was initialized to a specified count upon starting the timer. The counter is decremented once each time a timer interrupt occurs. After a certain number of interrupts the count reaches zero and the timer interrupt handler sets a corresponding flag. The non vital timer routine monitors flags associated with the timers and when one is set, an associated true value is taken from the ROM data tables and used to initialize an associated variable indicating the passage of the allotted time. When the flag is not set the variable is initialized with a false value taken from the timer ROM data tables.

Messages are received under interrupt control by the radio interrupt handler which is also shown on the upper right hand portion of FIG. 5. The decoded message is formed in a received message buffer in CPU memory and a flag is set. The decode new message routine which follows the non vital timer routine processes the received message when the complete message is formed and the flag is set. The routine first causes non-vital checks to be performed to verify that the address and check sum are correct. If a received message passes these tests, processing continues. A logic variable in the control expression corresponds to each message received by the controller system. The link between the received message and the associated logic variable is provided in a received message ROM data table. When a valid message is received, the corresponding logic variable is set true. The true value is not stored, but is calculated from the newly received message. Received messages consist of a message part and a check sum as discussed in the Spacerail U.S. Pat. No. 4,711,418 issued to Auer et al and mentioned above.

The security of the message lies in its check sum which is unique for each message received by the switch controller 11. To create the true value which verifies that a message has been received, the message check sum is passed through a polynomial divider. The remainder left after the polynomial division is the true value used to initialize the corresponding variable. This process has the advantage that it destroys the message in the process of using it thereby guaranteeing that a message can only be used once. The polynomial division process is described in the Rutherford U.S. Pat. No. 4,831,521. The read inputs, non-vital timer and decode new message processes enable the logic equations which describe the system performance to be solved. The process of evaluating the logic expressions is as follows: Each variable in the system has two parts—a flag which non-vitally indicates if it is true or false, and the value which is set to one unique number when the variable is true and a different unique number when it is false. Each expression is in a sum-of-products form.

$$X = A*B + C*D$$

Where A*B is the product of the variables A*B, and X is true if A and B are true or if C and D are true and otherwise it is false.

If all variables in any one product term (A*B or C*D) are true, then the expression is true and the corresponding expression variable is set true. Otherwise the expression evaluates false. As soon as one product term is found to evaluate true, processing of that expression can stop because no matter how the remaining product terms evaluate, the expression results is true as is apparent from the above Boolean equation. To evaluate a product term, each variable in the product term is first examined to see if it appears true. This is done by checking the flag of each variable in the product term. If the flag is set, the term is true, and the expression is evaluated. The actual expression is evaluated by a process of polynomial division similar to that used in the decoding of the received messages. The value of each variable in the product term is fed in sequence into a polynomial divider. The remainder left in the polynomial divider following this process is used to set the value of the variable which becomes true as a result of the evaluation of this expression. As with the decoding of received messages, the value is never stored in the system but is calculated. The calculation uses the values for each variable in the product terms and each of these values must be true to correctly calculate the true value of the expression. Each variable value used in the process is the result either of a previous expression evaluation or of an input operation. Accordingly, vital operation is insured since each result or operation depends upon the previous result of operation being true.

To further enhance the vital operation of the system, the calculated expression values and the values created during the reading of inputs and the reception of messages can be different on alternate cycles through the loop. During odd cycles, one set of values is calculated and during even cycles a totally different set of values of calculated. Both sets are required in order to obtain correct results which represent vital operation of the system (each process of the system operating vitally). This operation insures that values cannot be retained from one cycle to the next and that a failure to update an expression results in an invalid or unuseable result.

The logical expressions which describe the system operations are, as noted above, defined by data tables stored in ROM. The tables contain an entry for each expression. The entry describes a number of product terms in each expression, the number of variables in each product term and the memory location of each variable. Also each expression entry contains the address of the variable which is to be assigned as a result of the expression evaluation and the false value to be assigned in the event that none of the product terms evaluate true. The expression evaluation takes place once each cycle. Since the tables describe the complete system logic, the system operation can be completely redefined by changing the data in the tables.

After expression evaluation is complete the outputs are processed. This process is carried out to update the system output to reflect the state of the variables in the output data. A ROM table is used to link the logic variables in the output data to specific hardware outputs. For non-vital outputs, the output routine simply checks the state of each variable listed in the output ROM table and sets or resets the corresponding outputs.

As noted above, certain of the variables evaluated during the expression evaluation authorize the transmission of specific messages by the system. A ROM data table makes the connection between these variables and the specific message to be sent. The conditions under which each message is transmitted are then determined by the system expressions as defined in the ROM tables. The transmit message routine searches the transmit ROM tables checking each variable named in the table. When a variable is found to be true, the transmission of the corresponding message is started. This routine sends only the first message byte and all subsequent bytes are transmitted under interrupt control.

The system contains only one vital output, and that is the signal which causes the track switch machine 24 to be operated and the switch 22 to be thrown. This output is generated by a VPC or vital power controller process. One of the variables evaluated during expression of valuation is the VPC variable. When expression evaluation indicates that the conditions ar such that the track switch can be thrown, this variable is true. Then the VPC can create vital power for one system cycle at the end of which the variable must be reevaluated to be true or the power stops.

The VPC routine is similar to that described in Rutherford U.S. Pat. No. 4,740,972. Briefly, when the VPC routine is running, it creates short bursts of a vital signal which is a square wave at a specific frequency. This signal is filtered and rectified to create positive and negative voltages which are in turn used to power the input stages of a DC to DC converter. The output of the DC to DC converter is the power which operates the track switch machine. The switch drive power is therefore only created when the VPC routine creates the vital drive signal and this routine only creates the vital drive signal when the VPC variable evaluates true. The output circuits switches the polarity of the voltage depending upon whether the switch is to be thrown normal or reverse as discussed above. This polarity reversal circuitry can be non-vital and receives its power completely from the vital power controller.

Preferably the VPC does not run constantly but instead runs periodically under interrupt control when active. The resulting vital drive signal then appears as bursts of a fixed frequency square wave. The circuitry is designed such that the repeated bursts are sufficient to create continuous vital power.

The cycle time check measures the time expended in each pass through the loop. As long as this time is within specified limits (within the expected cycle time), the system will continue to function. If the time is out of limits, the cycle time routine will cause the system to stop, forcing a hardware reset.

The radio interrupt handler processes interrupts from the radio interface circuitry (the modem and decoders 59, 61, FIG. 3). For incoming messages, each new character is placed in sequence in the receive buffer. When a complete message is present, a flag is set requesting service from the decode new message process. Similarly the radio interrupt handler oversees the transmission of messages one character at a time.

The hand held terminal 15 also has an interrupt handler process which performs a similar function for messages from the hand held terminal 15 when it is in use. As noted above, the timer interrupt handler runs the non-vital timers which generate the non-vital time delays.

The switch controller can be used to operate a powered truck switch machine or a hand throw track switch. For a hand throw track switch, the switch controller will either operate an electrical switch lock as discussed in the Spacerail U.S. Pat. No. 4,711,418 or light a panel indicator to show that it is permissible to manually operate the switch from the local control panel.

There ar three modes of operation for the switch controller, namely normal, office block and local block. During normal mode the switch is controlled only from the central office. In office block mode the office turns over control of the switch to trains in the switch vicinity. In this mode the switch controller can accept commands from any train (one at a time). This mode is intended for low speed switching movements such as encountered in the setting out of cars on a siding. While in this mode, the office logic must guarantee that the switch cannot be used in a normal high speed movement. Finally local block mode is entered whenever a designated shorting strap is removed from the switch controller chassis. In this mode the switch can only be controlled from its local control panel. Local block is intended for the protection at maintenance personnel.

In normal mode, the switch controller will accept commands only from the office. When a message is received to throw the switch, the switch controller will first determine the present switch position. If it is already locked in the requested position, the controller will respond with a message verifying the position. If it is not in the requested position, and it is not in local block mode, and its OS track circuit is not occupied, it will accept to operate the switch to the requested position. If these conditions are not met, the switch controller will respond with a message indicating that it cannot operate the switch and the reason why. When the controller does attempt to throw the switch, a time limit is placed on the switch operation. If the operation is not completed within the designated time, the switch controller will stop attempting to throw the switch and send a message to the office indicating that the switch is not in the requested position and that a time out has occurred.

When the office senses that a train is approaching a switch, it will send a message to the switch which identifies the approaching train. At this point the office has cleared a route over the switch. The switch will then constantly monitor its position, and if any unexpected changes of state are encountered, it will send an emergency message both to the office and to the approaching train to provide warning of the condition. Also when the switch controller senses an output from the OSTC 13 drop indicating occupancy, it will send a message to the office and the approaching train. The train can then determine whether it has occupied the OSTC vicinity itself or whether the OSTC shows occupancy for another reason and take appropriate action. In normal operation, as a train crosses the switch, the switch controller will sense the output (dropping and repicking) of the OSTC 13 for appropriate minimum periods of time. It will then send a message to the assigned train and discard the train's identity upon completion of the message interchange. This message indicates to the train that its trailing end has cleared the switch. This feature enables location of the rear of cabooseless trains, for which it is presently difficult to verify that the train has cleared the switch when it takes a siding.

To place the switch controller in office block mode, the office must send an authorizing message to the switch controller. Once this message is sent, the office can no longer clear routines over the switch until it removes the switch from office block and receives confirmation that the switch has returned to normal mode. In office block mode, a switch controller is free to accept control messages from any train or the office. Once a train gains control of a switch, the switch will not accept control messages from other trains for a designated period of time or until the switch senses the passing of the train by the normal drop and pick of the OS track circuit. If a train does not cross the switch within the designated time interval, the switch will release from that train and accept control by other trains. Once the switch controller accepts a message from a train, it will perform checks and a time out similar to those used in normal mode before commands are executed. There will be no emergency messages during office block mode because the low speed switching moves will not entail a safety hazard. When a train sends a control of a second train, the switch will respond with a message indicating that it is not available.

To enter local block mode, a shorting strap will be removed from the local control panel. With this strap removed the switch will not be able to be controlled from either the office or a train. It will only respond to inputs from the local control panel.

Hand-throw track switches will operate similarly to power switches. When the office intends to clear a route over a hand-throw switch, it will first query the switch for its position. If the switch is aligned as desired, the switch operation will proceed as for a power switch. If the switch is not aligned as desired, the office will give the train a stop aspect at the switch. When the train stops at the switch, the office will determine if conditions permit the switch to be thrown, and if so, it will transmit a message to the switch authorizing the movement. This message will cause a flashing indication on the control panel to indicate to the crew that they are permitted to operate the switch. In the event that the switch is equipped with an electric switch lock this message will unlock the switch and allow it to be thrown.

Not all hand-thrown switches will be equipped with a OSTC, and in such cases the OSTC cannot be used to indicate the passage of a train over the switch. In this case the office will release a switch from an assigned train once the office senses that the train has cleared the switch. In office block mode, switches without a OSTC will only release from a capturing train after the time-out.

From the foregoing description it will be apparent that improved railway control system has been provided which enables verification of the integrity of identification addresses. While the invention as described embodied in a radio based track switch control system, other applications and uses of the invention as well as modifications in that system will become apparent to those skilled in the art. Therefore, the foregoing description should be taken as illustrative and not in a limiting sense.

I claim:

1. The method of controlling a railway track switch by data transmitted over a communications link which addresses the switch and instructs it to move a requested position which comprises programming when manually enabled a memory with address data corresponding to the address of said switch, storing in said memory at least one check word for said address, causing said switch to move to said requested position when said data which is transmitted corresponds to the address programmed in said memory, and when words corresponding to said check words are produced by writing at least one message in a check register while presenting said message to said memory to supplant said check word therein with said message when a failure mode enables writing of said message into said memory, and producing from the message in said check register and from the data in said memory said check words in the absence of said failure mode.

2. The method according to claim 1 wherein said producing step is carried out by an exclusive or operation of the message in said check register with the data corresponding to said check word in said register.

3. The method according to claim 1 wherein said programming step is carried out by generating said address data in a portable terminal and enabling the entry of said data into said memory by generating an enabling signal with the aide of an electrical switch.

4. The method according to claim 1 wherein said storing step is carried out by generating a plurality of said check words each in a different location in said memory, generating a plurality of first words as said message each being unique and each corresponding to a different one of said check words, generating words having a value equal to the sum of said first words and said check words as the check words in said memory, writing said first words iteratively into said check register, and iteratively generating the difference between said first words in said check register and said check words in said register, and said step of causing said track switch to operate is enabled when said difference equals said check words in value for each of said plurality of check words thereby indicating the absence of the failure mode.

5. The method according to claim 4 wherein said step of causing said track switch to operate comprises the step of generating vital power and applying said vital power to said switch when said transmitted data corresponds to a command to operate said switch and said plurality of check words indicating the absence of a failure mode are produced.

6. The method according to claim 5 further comprising transmitting a message indicating the operation and state of said track switch after said causing step is completed.

7. Apparatus for controlling a railway track switch by data transmitted over a communications link which addresses the switch and instructs it to move to a requested position which comprises means for programming when manually enabled a memory with address data corresponding to the address of said switch, means for storing in said memory at least one check word for said address, a check register, means for writing at least one check value message into said check register while presenting said message to said memory to supplant said check work therein, means for causing said switch to move to said requested position when said data which is transmitted corresponds to the address programmed in said memory, and when words corresponding to said check words are produced rather than said message thereby representing a failure mode which enables writing of said message into said memory, and means for producing from the message in said check register and from the data in said memory said check words in the absence of said failure mode.

8. The apparatus according to claim 7 wherein said producing means comprises exclusive-or logic to which the message in said check register and the data corresponding to said check word in said register are applied or input on a bit by bit basis.

9. The apparatus according to claim 7 wherein said programming means comprises portable terminal means for generating said address data, and means enabling the entry of said data into said memory by generating an enabling signal with the side of an electrical switch.

10. The apparatus according to claim 7 wherein said storing means comprises means for generating a plurality of said check words each in a different location in said memory, means for generating a plurality of first words as said message each being unique and each corresponding to a different one of said check words, generating words having a value equal to the sum of said first words and said check words as the check words in said memory, means for writing said first words iteratively into said check register, and means for iteratively generating the difference between said first words in said check register and said check words in said register, and means for enabling said means for causing said track switch to operate when said difference equals said check words in value for each of said plurality of check words thereby indicating the absence of the failure mode.

11. The apparatus according to claim 10 wherein said step of causing said track switch to operate comprises means for generating vital power and applying said vital power to said switch when said transmitted data corresponds to a command to operate said switch and said plurality of check words indicating the absence of a failure mode are produced.

12. The apparatus according to claim 11 further comprising means for transmitting a message indicating the operation and state of said track switch after said causing means operates.

* * * * *